F. S. YOUNG.
CHALK LINE REEL.
APPLICATION FILED SEPT. 7, 1918.

1,297,959.

Patented Mar. 18, 1919.

Inventor
F. S. Young
By Victor J. Evans
Attorney

UNITED STATES PATENT OFFICE.

FRANK S. YOUNG, OF RIVERSIDE, CALIFORNIA.

CHALK-LINE REEL.

1,297,959.  Specification of Letters Patent.  Patented Mar. 18, 1919.

Application filed September 7, 1918. Serial No. 253,036.

*To all whom it may concern:*

Be it known that I, FRANK S. YOUNG, a citizen of the United States, residing at Riverside, in the county of Riverside and State of California, have invented new and useful Improvements in Chalk-Line Reels, of which the following is a specification.

This invention relates to reeling and winding devices, and has for its object the provision of a reel adapted for the use of carpenters and others upon which a chalk line may be quickly and easily wound and from which the chalk line may be readily unwound for use.

An important object is the provision of a reel of this character to which one end of a chalk line is permanently secured and which is provided with means whereby the other end of the chalk line may be detachably engaged thereon.

A further object is the provision of a reel of this character which will be extremely simple and inexpensive in manufacture, highly efficient in use, durable in service and a general improvement of the art.

With the above and other objects and advantages in view, the invention consists in the details of construction to be hereinafter more fully described and claimed, and illustrated in the accompanying drawings in which:—

Figure 1:
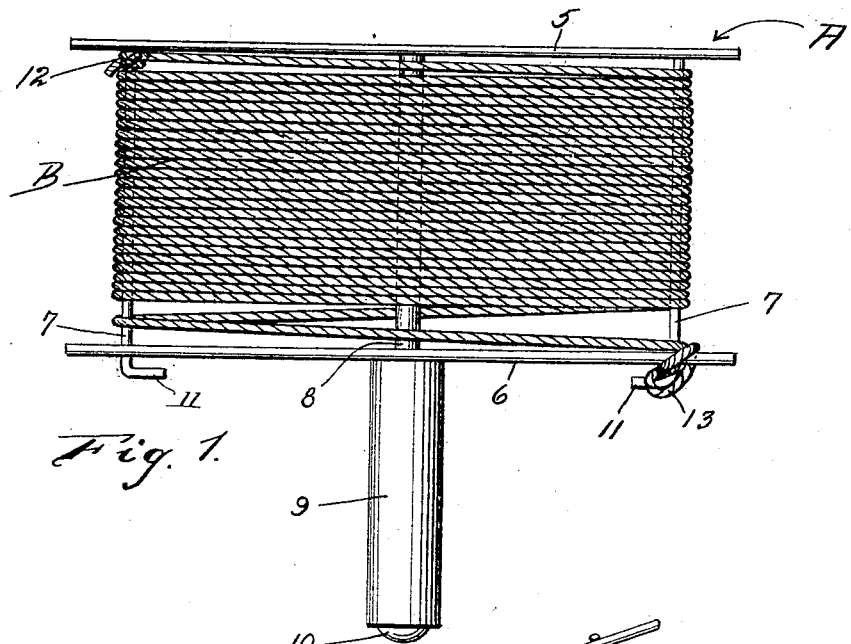
Figure 2:
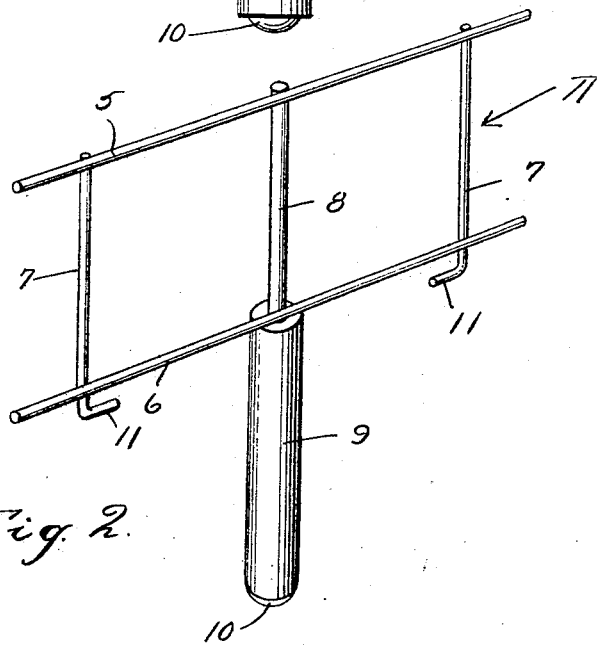

Figure 1 is a front elevation of the reel showing a chalk line wound thereon and Fig. 2 is a perspective view with the chalk line removed.

Referring more particularly to the drawing the letter A designates the body portion of my device which is formed as a rectangular frame including longitudinal wires 5 and 6 connected at their ends by transverse wires 7 preferably soldered thereto. Centrally of the frame A I provide a shank 8 which is soldered or otherwise secured to the longitudinal wires 5 and 6 and which has its projecting end portion revolubly disposed within a handle 9 of preferably cylindrical form. The extremity of the shank 8 is provided with an enlarged head 10 bearing against the end of the handle 9 whereby the handle will be prevented from disengagement with the shank. One end wire 7 of the frame has its end adjacent the handle 9 provided with a hook 11 which extends toward the handle.

In use, the chalk line B has one end secured upon either of the end wires 7, as shown at 12 and is wound upon the frame A of the device with its convolutions extending longitudinally of the frame. It will be noted that the ends of the longitudinal frame wires 5 and 6 extend beyond the end wires 7 so as to provide retaining means for preventing the coils of the chalk line slipping off of the frame. The free end of the chalk line B is provided with a loop 13 which is engageable upon the hook 11 for preventing the chalk line from unwinding. The chalk line being disposed upon the reel as above described, when its use is desired, it is merely necessary to disengage the loop 13 from the hook 11 whereupon the desired length of line may be drawn from the reel. When the use of the line is no longer desired it may be readily wound upon the reel as will be readily apparent.

From the foregoing description and a study of the drawing it will be seen that I have thus provided a very simple and efficient reel upon which a chalk line may be disposed for convenient use, the device having the further advantage of preventing the line from becoming tangled and unnecessarily soiled.

Having thus described my invention I claim:—

1. A device of the character described comprising a rectangular frame including spaced longitudinal members, transverse members secured to said longitudinal members at points spaced from the ends thereof, a shank disposed transversely of the frame at the center thereof and secured to said longitudinal members, a handle revolubly connected with said shank, and a hook formed on the inner end of each of said transverse members and directed toward said handle, in combination with a line wound longitudinally upon said frame and secured thereto at one end and having its other end provided with a loop engageable upon said hook.

2. A reel of the character described comprising a· rectangular frame including spaced parallel longitudinal wires, transverse wires soldered to said longitudinal wires at points spaced from the ends thereof, a shank disposed transversely of the frame at the center thereof and soldered to said longitudinal wires, a handle revolubly connected with said shank, the ends of the transverse wires at the sides of the frame adjacent the handle projecting beyond the adjacent longitudinal wire and being laterally directed for said handle whereby to provide retaining hooks.

In testimony whereof I affix my signature.

FRANK S. YOUNG.